United States Patent [19]

Sato et al.

[11] Patent Number: 4,963,004
[45] Date of Patent: Oct. 16, 1990

[54] OPTICAL ADDER FOR OPTICAL ATTENUATION

[75] Inventors: Masaichi Sato; Hideo Imazeki, both of Tokyo, Japan

[73] Assignee: Ando Electric Co., Ltd., Tokyo, Japan

[21] Appl. No.: 411,556

[22] Filed: Sep. 22, 1989

[30] Foreign Application Priority Data

Sep. 30, 1988 [JP] Japan .................................. 63-247127

[51] Int. Cl.⁵ ........................... G02B 5/23; G02B 5/30
[52] U.S. Cl. ..................................... 350/403; 350/400
[58] Field of Search ............... 350/404, 401, 403, 408, 350/350 R, 400, 314, 394, 342, 335, 96.15; 356/371, 350, 351, 359; 369/44; 250/227

[56] References Cited

U.S. PATENT DOCUMENTS

| 4,305,046 | 12/1981 | Le Floch et al. | 350/400 |
| 4,456,339 | 6/1984 | Sommargren | 350/403 |
| 4,541,691 | 9/1985 | Buzak | 350/335 |

Primary Examiner—Bruce Y. Arnold
Assistant Examiner—James Phan
Attorney, Agent, or Firm—Flynn, Thiel, Boutell & Tanis

[57] ABSTRACT

There is provided an optical adder for accurately and additively specifying variable optical attenuation, which comprises a quarter wave plate disposed on an optical axis for changing an incident linearly polarized light beam emanating from a light source to a circularly polarized light beam; and one or more neutral density filter plates all disposed on the optical axis next to said quarter wave plate for attenuating the incident circularly polarized light beam respectively additively by a predetermined amount.

1 Claim, 1 Drawing Sheet

OPTICAL ADDER FOR OPTICAL ATTENUATION

BACKGROUND OF THE INVENTION

1. Field of the Invention:

The present invention relates to an optical adder for optical attenuation and more specifically to an optical adder for accurately and additively specifying variable optical attenuation.

2. Description of the Prior Art

The amount of attenuation of a light beam (hereafter "a light") transmitted through an optical fiber and the like was hitherto measured highly accurately, but only within an allowable level of a standard optical power meter at a receiving part.

A prior art optical attenuator to specify such attenuation of a light through an optical fiber and the like was arranged and utilized as follows: First, an optical power meter made of silicon and germanium is prepared, for example, which has been widely used as having a good linear response to any light. Then, the amounts of optical attenuation of lights emitted from an LED (light emitting diode) or from an LD (laser diode) for example through a standard attenuator are once measured by the optical power meter in a stepwise manner, say at each 10 dB; from the maximum level, say −25 dB in the LED or −10 dB in the LD for example to a predetermined lower level. Here, the just mentioned attenuation in the stepwise manner is assumed to be most reproducible. For the lower level than the predetermined lower level, such a measurement is continued with the aid of another attenuator. Those amounts of attenuation so measured are supposed to be reproducible thereafter, for calibration. That is, linearity of the measurement of attenuation over a wide dynamic range is assumed to be assured. Thus, any optical attenuator can be calibrated on the basis of the optical power meter.

However, a laser power standard has been defined to be basically higher than 0 dB in various public facilities, differing from the aforesaid levels and making ambiguous the guaranteed accuracy of the amount of attenuation. Thus, commercial optical attenuators are in need of excess redundancy compared with their actual capabilities of attenuation.

Additionally, the amount of attenuation is severely varied depending upon the input conditions into such an attenuator. Those input conditions include for example various properties of a spatial beam such as its wavelength and its diameter, etc., and of an optical fiber used such as its being a single mode one or a graded index one, etc. The most part of error factors involved in the optical attenuation measurement relies on those input conditions.

Generally, to attenuate an arbitrary level of light, an ND (neutral density) filter plate (hereinafter, referred to as an ND plate) is available, which is disposed at a certain angle with respect to an optical axis, a light source becomes unstable owing to the reflection of the light thereon. The ND plate exhibits a polarizing property to a light incident thereon when it is slanted with respect to the optical axis of the incident light. For example, an ND plate capable of attenuation of an incident light by 10 dB might produce an error of about 0.2 dB when slanted by about 10°.

The attenuation through the ND plate is not affected by the use of a light emitting diode as an optical source, which diode emits non-polarized light, but it is changed owing to the polarizing property of the slanted ND plate at the use of a laser diode (hereinafter, referred to as an LD) and the like which emits a linearly polarized light.

In what follows, such prior art techniques to attenuate a light will be described in further detail with reference to FIGS. 3 and 2.

Referring to FIG. 3, a situation of the use of a single ND plate is illustrated in a block diagram.

As illustrated in FIG. 3, a light 4 emitted from a light source 1, which light is a linearly polarized one 5, passes through a ND plate 2 and is incident on an optical power meter 3. If no ND plate 2 is located on an optical axis, then the light 1 is detected directly by the optical power meter 3, keeping unchanged the polarization state thereof, i.e., the linearly polarized state thereof. On the contrary, if the ND plate 2 is located on the optical axis, then the linearly polarized light 5 is changed to a circularly polarized light 6 after transmission through the ND plate although depending upon an insertion angle $\theta$ of the ND plate, and thereafter detected by the optical power meter 3. In this situation where the single ND plate 2 is used, no problem of insertion loss (or attenuation) is produced.

Referring then to FIG. 2, a prior art situation with the use of two sheets of the ND plates is illustrated in a block diagram.

As in the previous case shown in FIG. 3, a light 4 emitted from a light source 1 is detected by an optical power meter 3, keeping unchanged its property as a linearly polarized light, as described previously, unless there are disposed ND plates 2 and 7 on an optical axis. When a single ND plate 2 is interposed (as shown in FIG. 3) instead of the ND plates 2 and 7 with the same input conditions as these shown in FIG. 2, and with a linearly polarized light as an input then the input light is taken out as a circularly or elliptically polarized light. If two sheets of the ND plates are interposed as in FIG. 2, then the polarization state is as follows. When those ND plates 2 and 7 are disposed at an angle $\theta$ on the optical axis, the linearly polarized light 5 is changed to circularly polarized light 6 after transmission through the ND plate 2, which is then incident upon the ND plate 7. An emergent light from the ND plate 7 changes its polarization state into a circularly polarized light 8, which is detected by an optical power meter 3.

Such a change in the polarization state of the incident light on the ND plate 7, however, produces a problem in the prior technique in that the amount of attenuation of a light transmitted through an optical fiber and the like must be measured under different conditions on all such occasions because the transmission of the light through the ND filter is altered as a result of the change in the polarization state of the light.

SUMMARY OF THE INVENTION

In view of the drawbacks of the prior techniques, it is an object of the present invention to provide an optical adder for accurately and additively specifying optical attenuation of a light transmitted through an optical medium such as an optical fiber, the optical adder being capable of obtaining the accurate amount of the attenuation of the light by changing the polarization state of the light before entering an ND plate, i.e., by changing a linearly polarized light to a circularly polarized one with the use of a quarter wave plate.

To achieve the above object, an optical adder for accurately and additively specifying variable optical attenuation of a light according to the present invention comprises a quarter wave plate disposed on an optical axis for changing an incident linearly polarized light coming from a light source to a circularly polarized light; and one or more neutral density filter plates all disposed on the optical axis next to said quarter wave plate for attenuating the incident circularly polarized light respectively additively by a predetermined amount. same.

The above and other objects, features and advantages of the present invention will become more apparent from the following description taken in conjunction with the accompanying drawings.

DESCRIPTION OF THE PREFERRED EMBODIMENT

A preferred embodiment of an optical adder for accurately and additively specifying variable optical attenuation according to the present invention will be described with reference to the accompanying drawings.

Figure 1:
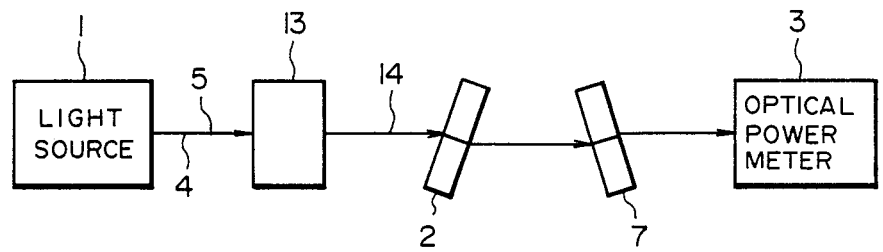
FIG. 1 is a view illustrating the arrangement of an embodiment of an optical adder for accurately and additively specifying variable optical attenuation according to the present invention.
Figure 2:
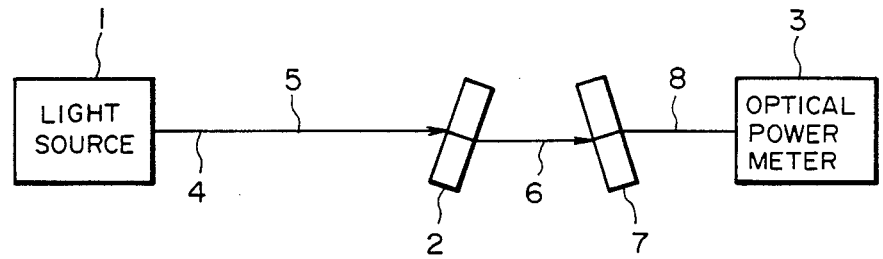
FIG. 2 is a view illustrating the arrangement of a prior technique of optical attenuation.
Figure 3:
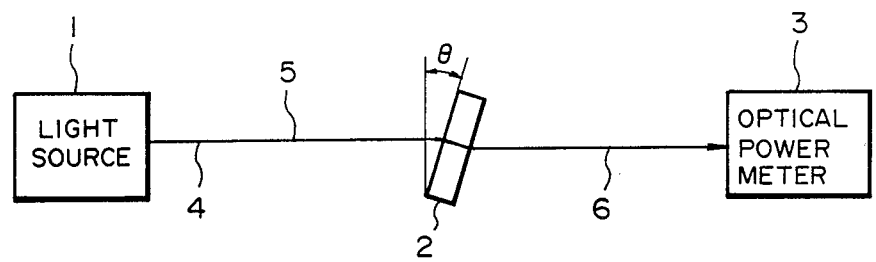
FIG. 3 is a view illustrating a prior art situation of optical attenuation when a single ND plate is interposed.

Referring to FIG. 1, a situation of the preferred embodiment is illustrated. As shown in the figure, a light 4 emitted from a light source 1 enters a quarter wave plate 13, and emanates from the same plate 13 as a circularly polarized light 14 provided the light 4 incident on the plate 13 is a linearly polarized one. The circularly polarized light 14 emanating from the quarter wave plate 13 is then incident on a first ND plate 2 and further after transmission through the plate 2 on a second ND plate 7. A transmitted light through the second ND plate 7 finally enters an optical power meter 3, which meter hereby detects the transmitted light and determines the optical power of the light.

It should here be noticed that any circularly polarized light incident on an ND filter is transmitted substantially intactly therethrough without changing its polarization state even if one or more of such ND plates are inserted in the system. That is, when any one of the ND plates 2 and 7, i.e., a single ND plate is interposed, the polarization state of a transmitted light therethrough remains unchanged, which is then detected by the optical power meter 3. Likewise, when two sheets of the ND plates 2 and 7 are interposed, a circularly polarized light transmitted through the ND plate 2 is further transmitted intactly, i.e., without changing its polarization state through the ND plate 7, which is then detected by the optical power meter 3. Thus, the amount of attenuation of a light passing through such ND plates is accurately proportional to the number of those ND plates, permitting accurate additivity of the attenuation through the ND filters.

For example, when the amount of attenuation of a light through an ND plate is experimentally measured as being 10 dB, a deviation of the amount of attenuation between an expected value, which is determined by a standard system already described, and the just-mentioned measured value is $\pm 0.03$ dB without use of the quarter wave plate but is $\pm 0.01$ dB with use of the quarter wave plate.

Similarly, when the amount of attenuation of a light through an ND plate, which is experimentally measured, is 30 dB, the deviation is $\pm 0.08$ dB without a quarte wave plate but is $\pm 0.01$ dB with the quarter wave plate.

Further, when the amount of attenuation experimentally measured is 50 dB, the deviation is $\pm 0.1$ dB without the quarter wave plate but is $\pm 0.02$ dB with the quarter wave plate.

In accordance with the present invention, as described above, the provision of a quarter wave plate in front of one or more of the ND plates assures accurate measurement of the amount of attenuation of a light emanating from a light source through the one or more ND plates without replacing an optical power meter, although in the prior techniques the accurate amount of attenuation of a polarized light from a light source was measured by using an optical power meter for each combination of ND plates as described previously.

Although a certain preferred embodiment has been shown and described, it should be understood that many changes and modifications may be made therein without departing from the scope of the appended claims.

What is claimed is:

1. An optical adder for accurately and additively specifying variable optical attenuation of a polarized light beam emitted from a light source, comprising:

a quarter wave plate disposed on an optical axis for changing an incident linearly polarized light beam emanating from the light source to a circularly polarized light beam; and one or more neutral density filter plates all disposed on the optical axis next to said quarter wave plate for attenuating the incident circularly polarized light beam additively by a predetermined amount.

* * * * *